US010050346B2

United States Patent
Matitsine et al.

(10) Patent No.: US 10,050,346 B2
(45) Date of Patent: *Aug. 14, 2018

(54) LENS BASED ANTENNA FOR SUPER HIGH CAPACITY WIRELESS COMMUNICATIONS SYSTEMS

(71) Applicant: Matsing, Inc., Irvine, CA (US)

(72) Inventors: Serguei Matitsine, Irvine, CA (US); Leonid Matytsine, Irvine, CA (US); Anthony DeMarco, Leadville, CO (US)

(73) Assignee: Matsing Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/593,207

(22) Filed: May 11, 2017

(65) Prior Publication Data
US 2017/0264017 A1    Sep. 14, 2017

Related U.S. Application Data

(63) Continuation of application No. 15/230,237, filed on Aug. 5, 2016, now Pat. No. 9,666,943.
(Continued)

(51) Int. Cl.
*H01Q 19/06* (2006.01)
*H01Q 5/30* (2015.01)
(Continued)

(52) U.S. Cl.
CPC .............. *H01Q 5/30* (2015.01); *H01Q 3/46* (2013.01); *H01Q 15/02* (2013.01); *H01Q 25/00* (2013.01); *H04W 16/28* (2013.01)

(58) Field of Classification Search
CPC ............ H01Q 3/46; H01Q 1/241; H01Q 1/36; H01Q 19/06
(Continued)

(56) References Cited

U.S. PATENT DOCUMENTS 2,665,382 A * 1/1954 Smith .................... H01Q 13/12
343/770
3,293,645 A * 12/1966 Farley .................... H01Q 1/281
343/708
(Continued)

FOREIGN PATENT DOCUMENTS

CN          102122762         8/2013

OTHER PUBLICATIONS

Rondineau, Sebastien, et al.; Multibeam Spatially-Fed Antenna Arrays with Amplitude-Controlled Beam Steering; Department of Electrical and Computer Engineering, University of Colorado at Boulder; Proceedings of the 2003 Antenna Applications Symposium; Monticello, Illinois; Sep. 17-19, 2003, vol. 1.
(Continued)

*Primary Examiner* — Huedung Mancuso
(74) *Attorney, Agent, or Firm* — Fish IP Law, LLP

(57) ABSTRACT

An antenna includes a stack of cylindrical lenses combined with feed elements to provide multi-beam coverage for a given wireless communication sector. Each cylindrical lens disc has approximately the same height as the feed elements being used with the lens. To overcome the problem of interference from cables and opposing feeds, feed elements are placed around the lens. The cylindrical lenses are stacked such that a small gap exists between each pair of adjacent cylindrical lenses, allowing for cable lines to pass through between the pair of the cylindrical lenses, and thus removing interference for 360 degree coverage. Cable lines are arranged such that they only traverse the portion of the circumferential surfaces of the cylindrical lenses that do not interfere with the field of view of the RF signals generated by the corresponding feed elements.

12 Claims, 2 Drawing Sheets

Related U.S. Application Data

(60) Provisional application No. 62/201,512, filed on Aug. 5, 2015.

(51) Int. Cl.
  *H01Q 25/00* (2006.01)
  *H01Q 15/02* (2006.01)
  *H01Q 3/46* (2006.01)
  *H04W 16/28* (2009.01)

(58) Field of Classification Search
  USPC .......................................................... 343/753
  See application file for complete search history.

(56) References Cited

U.S. PATENT DOCUMENTS

| | | | |
|---|---|---|---|
| 4,087,823 A | 5/1978 | Faigen | |
| 5,708,679 A * | 1/1998 | Fernandes | H01Q 3/14 343/700 MS |
| 6,118,406 A | 9/2000 | Josypenko | |
| 6,812,903 B1 | 11/2004 | Sievenpiper | |
| 7,034,753 B1 * | 4/2006 | Elsallal | H01Q 21/0006 343/700 MS |
| 7,283,102 B2 | 10/2007 | Miles | |
| 7,456,803 B1 | 11/2008 | Sievenpiper | |
| 8,063,840 B2 * | 11/2011 | Matthews | H01Q 3/24 343/753 |
| 2003/0146872 A1 | 8/2003 | Kellerman | |
| 2009/0237314 A1 * | 9/2009 | Lalezari | H01Q 21/10 343/721 |
| 2014/0176385 A1 * | 6/2014 | Apostolos | H01Q 1/36 343/790 |
| 2014/0266939 A1 * | 9/2014 | Baringer | H01Q 21/28 343/729 |
| 2015/0070230 A1 | 3/2015 | Bradley | |

OTHER PUBLICATIONS

Turpin, Jeremiah P. and Wolfe, Dr. Douglas E.; A Switchable Magnetic Low-Index Metamaterial for Use in a Dynamically Reconfigurable Beam-Scanning Lens Antenna With a Single Feed; The Pennsylvania State University—The Applied Research Laboratory; Dec. 2014.

* cited by examiner

LENS BASED ANTENNA FOR SUPER HIGH CAPACITY WIRELESS COMMUNICATIONS SYSTEMS This application claims the benefit of U.S. non-provisional application Ser. No. 15/230,237 filed Aug. 5, 2016, which claims the benefit of U.S. provisional application No. 62/201,512 filed Aug. 5, 2015. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is radio frequency antenna technology.

BACKGROUND

The following description includes information that may be useful in understanding the present invention. It is not an admission that any of the information provided herein is prior art or relevant to the presently claimed invention, or that any publication specifically or implicitly referenced is prior art.

Wireless networks providing voice and data services are constantly expanding capacity to keep up with demand. Infrastructure build-out has traditionally comprised of adding more base stations and accompanying hardware at existing sites and adding new sites. State of the art antenna solutions are based on directional antennas utilizing radiating elements and a reflector. For applications where there are high data traffic requirements, multi-beam antenna solutions are becoming increasingly important. Multi-beam antennas are able to cover a wide area of coverage depending on the requirement and the antenna design (up to 360 degrees) while providing multiple beams for a given frequency or frequency range. Aside from traditional phased-array solutions, which have key drawbacks such as scope of coverage (can provided limited coverage, i.e., not 360 degrees), size and individual beam performance (degradation of gain on side beams), there are possibilities of using a RF lens approach.

One proposed solution is using cylindrical RF Lenses which are capable of providing multiple beams for different sector coverage. However, using a cylindrical lens approach can present challenges for providing 360 degree coverage as when feeds (emitters) are traditionally positioned around the circumference of the cylinder, there is interference from opposing feeds (feeds placed directly opposite each other on the cylinders circumference).

Furthermore this approach is limited in providing a narrow vertical beam. Due to the shape of the cylinder, only the horizontal resultant beam-width of the feed is affected by the cylinder while the vertical beam-width remains unchanged. Another approach is to use a spherical lens such as a Luneburg Lens, which, due to its symmetrical spherical shape equally narrows both the resultant horizontal and vertical beam-width of the feeds placed around the circumference of the Lens. However even though this approach provides reduced interference from opposing feeds (based on the size of the sphere used, the resultant beam would be several times larger than the opposing feed, thus reducing its interference), interference still exist and the size and cost of the solution provide drawbacks to this approach. Aside from the feeds themselves, the required cable lines and any support structures further add to interference for both lens approaches. Therefore the challenge is providing a 360 multi-beam solution with limited interference from feeds, cable lines and any support structures.

Thus, there is still a need for an effective and efficient antenna for use with extremely high capacity wireless communication systems.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides apparatus, systems and methods in which a stack of cylindrical lenses are combined with feed elements (or arrays of feed elements) to provide multi-beam coverage for a given wireless communication sector. The lens can be constructed from multiple cylindrical lenses where each cylindrical lens disc has approximately the same height as the feed elements being used with the lens. To overcome the problem of interference from cables and opposing feeds, feed elements are placed around the lens (feeds facing each other on opposite sides). Alternatively, feed elements can be arranged around a cylindrical lens section to cover approximately 120 degrees of field of view. Three such cylindrical lenses can then be stacked (combined) along the axes of the cylindrical lenses to create 360 degree coverage. The cylindrical lenses are stacked such that a small gap (about the width of a cable) exists between each pair of adjacent cylindrical lenses, allowing for cable lines to pass through between the pair of the cylindrical lenses, and thus removing interference for 360 degree coverage. Cable lines are arranged such that they only traverse the portion of the circumferential surfaces of the cylindrical lenses that do not interfere with the field of view of the RF signals generated by the corresponding feed elements.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
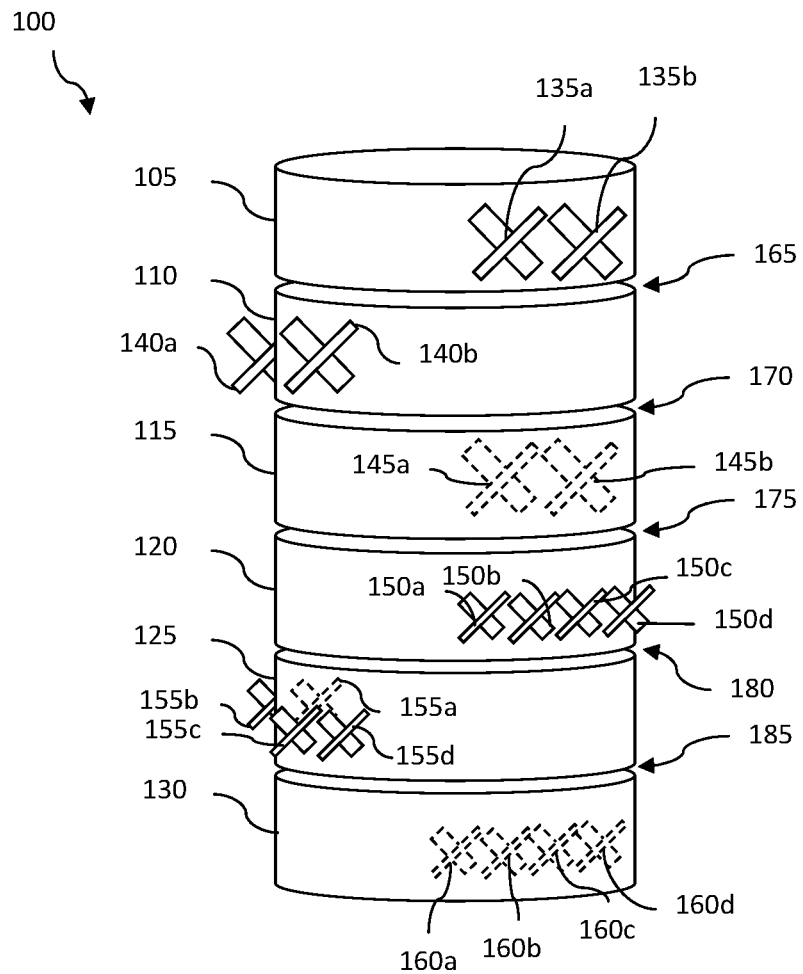
FIG. 1 illustrates an exemplary antenna system of some embodiments that includes a stack of cylindrical lenses.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, or a module is described as configured to perform a set of functions, the meaning of "configured to" or "programmed to" is defined as one or more processors being programmed by a set of software instructions to perform the set of functions.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The inventive subject matter provides apparatus, systems and methods in which an antenna having multiple cylindrical lenses and feed elements (or arrays of feed elements) to provide multi-beam coverage for a given wireless communication sector. The feed element is an electronic device for emitting RF signals, detecting RF signals, or both. In some embodiments, the feed elements are disposed near the surface of the cylindrical lenses (e.g., within 5 inches, preferably within 2 inches of the surface of the lens). Preferably, each lens element also includes a mechanism for moving the feed element along the surface of the lens in order to adjust the angles and direction in which the feed element emits/receives the RF signals. Details of this mechanism for moving the feed elements can be found in a co-owned U.S. patent application Ser. No. 14/958,607, titled "Spherical Lens Array Based Multi-Beam Antennae," filed Dec. 3, 2015, which is incorporated in its entirety herein by reference.

A cylindrical lens is a lens with an exterior surface having a shape of (or substantially having a shape of) a cylinder having a elliptical circumference and a height. As defined herein, a lens with a surface that substantially conform to the shape of a cylinder means at least 50% (preferably at least 80%, and even more preferably at least 90%) of the surface area conforms to the shape of a cylinder. Examples of cylindrical lenses include a cylindrical-shell lens, drum-shaped lens (a sphere with the top and bottom portions cut off and flattened), etc. The cylindrical lens can include only one layer of dielectric material, or multiple layers of dielectric material. A conventional Luneburg lens is a spherically symmetric lens that has multiple layers inside the sphere with varying indices of refraction.

In some embodiments, the antenna can include multiple cylindrical lenses that are stacked together along the axes of the cylindrical lenses. In some embodiments, each cylindrical lens in the stack has approximately the same height as the feed elements associated with the lens. To overcome the problem of interference from cables and opposing feeds if emitters were simply placed around the lens (feeds facing each other on opposite sides), feeds for each cylindrical lens can be arrange around a section of the lens to cover approximately 120 degrees field of view in the horizontal plane (a plane that is perpendicular to the axis of the cylindrical lens and parallel to the ground). Three such cylindrical lenses can then be stacked (combined) against each other along the axes of the cylindrical lenses to create 360 degree coverage.

In some embodiments, the cylindrical lenses are stacked in a way such that a gap exists between each pair of adjacent cylindrical lenses. In some embodiments, there is no dielectric material within the gap. The gaps between the cylindrical lenses allow the cable lines to pass through the stack of cylindrical lenses structure without obstructing any field of views of the feed elements.

This novel approach utilizes lens technology with radiating elements to create directional patterns providing multiple beams for up to 360 degree coverage. Specifically, this novel approach allows for the arrangement of lenses in a non-interfering fashion to allow for a systematic assembly of many lenses to support many frequency bands in all directions.

FIG. 1 illustrates an example antenna 100 having a stack of cylindrical lens elements. In this example, the antenna 100 includes six cylindrical lens elements 105, 110, 115, 120, 125, and 130. Each cylindrical lens element also includes multiple feed elements disposed along the circumferential surfaces of the cylindrical lenses. For example, the cylindrical lens element 105 includes two feed elements 135*a* and 135*b*, the cylindrical lens element 110 includes two feed elements 140*a* and 140*b*, the cylindrical lens element 115 includes two feed elements 145*a* and 145*b*, the cylindrical lens element 120 includes four feed elements 150*a*, 150*b*, 150*c*, and 150*d*, the cylindrical lens element 125 includes four feed elements 155*a*, 155*b*, 155*c*, and 155*d*, the cylindrical lens element 130 includes four feed elements 160*a*, 160*b*, 160*c*, and 160*d*. As shown, the cylindrical lenses have heights that are substantially the same as the heights of the feed elements. Preferably, the cylindrical lenses have heights that are slightly (e.g., less than 20% of the heights of the feed elements, preferably less than 10% of the heights of the feed elements, and even more preferably less than 5% of the heights of the feed elements) more than the heights of the lens elements.

The feed elements associated with each lens element are configured to generate RF signals that cover 120 degrees field of view via the cylindrical lens. In this example, the lens elements 105, 110, and 115 makes up a first set of lens elements configured to provide RF signal coverage of a first band (e.g., a low band (698 MHz-960 MHz), etc.). In this example, each feed element in the lens elements 105, 110, and 115 is configured to provide a distinct 60 degree coverage such that the combined coverage of the lens elements 105, 110, and 115 is substantially equal to 360 degrees.

Furthermore, the lens elements 120, 125, and 130 make up a second set of lens elements configured to provide RF signal coverage of a different, second band (e.g., a high band (1,710 MHz-2,690 MHz), etc.). In this example, each feed element in the lens elements 120, 125, and 130 is configured to provide a distinct 30 degree coverage such that the combined coverage of the lens elements 120, 125, and 130 is substantially equal to 360 degrees.

Frequencies and number of beams can be adjusted by using different radiating elements (feed elements), and adjusting the number of feed elements depending on coverage requirements (number of beams required). Furthermore the required resultant (achieved) beam width and beam pattern can be determined by the size (diameter) and shape of the cylindrical lenses.

This approach allows the user to design the type of cylindrical lens required (e.g., based on the number of beams radiating through lens, total coverage required, beam-width required, frequency range used, etc.), and combine different cylindrical lenses into one antenna for the desired coverage.

In some embodiments, the lens elements 105-130 are stacked together such that a small gap (e.g., gaps 165, 170, 175, 180, and 185) exists in between each adjacent pair of lens elements. Preferably, the gaps are just large enough to fit a width of the cable (not shown) that connects the feed elements to a terminal outside of the antenna, which requires the cables to traverses the cylindrical lenses. The gaps between the cylindrical lenses limit the interference typically caused by opposing feeds/cables/support structures when feeds are placed around a lens for 360 degree coverage.

Figure 2:
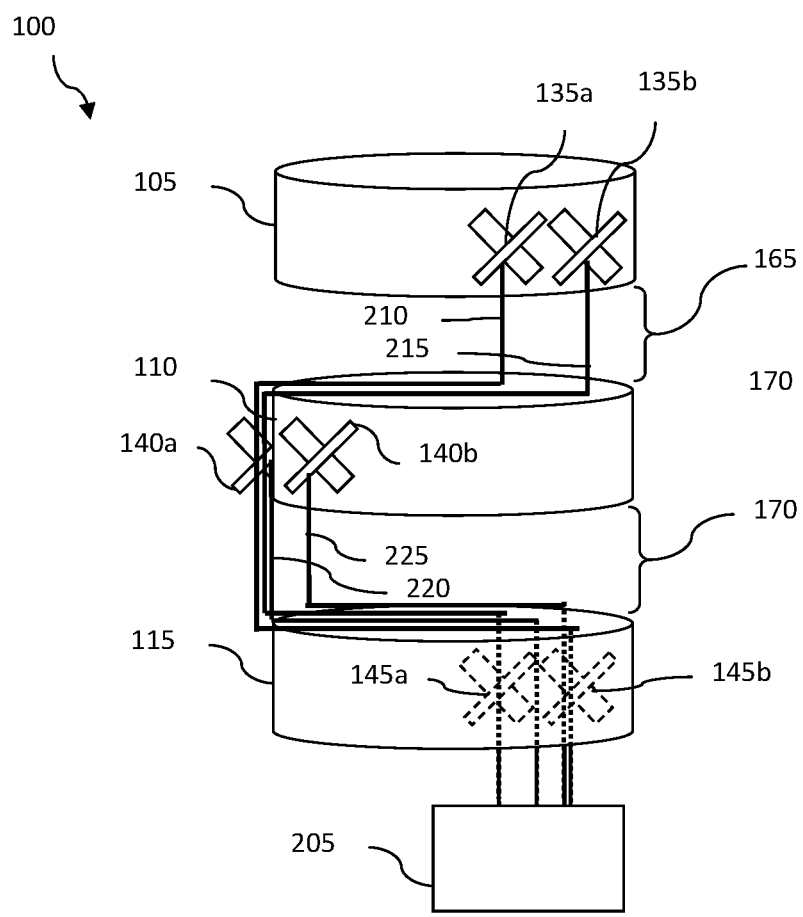
FIG. 2 illustrates an example cable arrangement of some embodiments through the stack of cylindrical lenses.

FIG. 2 illustrates the top three lens elements 105, 110, and 115 from the antenna 100 in FIG. 1, but with the gaps exaggerated for illustration purposes. Additionally, FIG. 2 shows cables that connect the feed elements to a signal processor 205. It is noted that each feed element is required to connect to the signal processor 205 via a cable in order to transmit and receive RF signals. Thus, the cable that connects to the feed elements 135*a* and 135*b* of the cylindrical lens 105 is required to traverse cylindrical lenses 110, 115, 120, 125, and 130 in order to connect to the signal processor 205.

Instead of traversing the cylindrical lenses 110, 115, 120, 125, and 130 by going straight down along the sides (circumferential surfaces) of the lenses, which will inevitably creates interference and obstruction for other lens elements, it is contemplated that the cables can traverse through the gaps between the cylindrical lenses. As shown, the cables 210 and 215 that connect feed elements 135*a* and 135*b*, respectively, to the signal processor 205 first runs straight down through the circumferential surface of the cylindrical lens 105 on the side of the feed elements 135*a* and 135*b* so to not obstruct the field of view of the lens element 105. The cables 210 and 215 then traverse the gap 165 between the cylindrical lenses 105 and 110 across the flat surface of the cylindrical lenses 105 and 110 (e.g., the bottom surface of the cylindrical lens 105 and the top surface of the cylindrical lens 110) to the side of the cylindrical lens 110 where the feed elements 140*a* and 140*b* are disposed, before coming straight down along the circumferential surface of the cylindrical lens 110 behind the feed elements 140*a* and 140*b*. Then, the cables 210 and 215 again traverses the gap 170 between the lens elements 110 and 115 across the flat surface of the cylindrical lenses 110 and 115 (e.g., the bottom surface of the cylindrical lens 110 and the top surface of the cylindrical lens 115) to the side of the cylindrical lens 115 where the feed elements 145*a* and 145*b* are disposed so not to obstruct the field of view of the lens element 115, before coming straight down along the circumferential surface of the cylindrical lens 115 behind the feed elements 145a and 145b. The cables 210 and 215 will traverse under this approach through the remaining lens elements in the antenna 100 before reaching the signal processor 205.

Similarly, the cables 220 and 225 that connect feed elements 140a and 145b, respectively, to the signal processor 205 first runs straight down through the circumferential surface of the cylindrical lens 110 on the side of the feed elements 140a and 145b so to not obstruct the field of view of the lens element 110. The cables 220 and 225 then traverse the gap 170 between the cylindrical lenses 110 and 115 across the flat surface of the cylindrical lenses 110 and 115 (e.g., the bottom surface of the cylindrical lens 105 and the top surface of the cylindrical lens 110) to the side of the cylindrical lens 115 where the feed elements 145a and 145b are disposed, before coming straight down along the circumferential surface of the cylindrical lens 115 behind the feed elements 145a and 145b. The cables 220 and 225 will traverse under this approach through the remaining lens elements in the antenna 100 before reaching the signal processor 205.

It is noted that at least a portion of the gaps 165, 170, 175, 180, and 185 that are not occupied by the cables, are occupied by a non-dielectric filler.

In some embodiments, a stack of cylindrical lenses with a single feed column can be employed (e.g., for a 120 degree coverage). In such an embodiment, multiple feed elements can be placed on the lens, for example to create a narrow beam, for use in an array, or to create distinct multiple beams. In such an embodiment, since each disc would typically be the same height as one element, if two rows of beams (i.e. two rows of elements) are desired (for example, to provide more port count or to array the elements so the resultant vertical beam width is narrowed) is possible to stack two sets of cylindrical lenses with their feed elements facing the same direction. In such an embodiment, there is no need for spacing to accommodate cabling. In such circumstances the spacing can be filled with filler material. In some embodiments, the spacing in the lens between each feed can be filled with filler material (e.g., a non-dielectric material).

Important features of an antenna assembly/system of the inventive concept include:
- The use of stacked cylindrical lenses (dielectric lens discs), where each lens provides 120 degree coverage (for a required frequency), with the lenses stacked on top of each other to create a 360 degree coverage, as opposed to placing feeds all around the circumference of a single cylindrical lens.
- Arrangement of the lenses and cabling (with gaps between discs), with the arrangement of the cabling designed to limit interference for 360 degree coverage
- In an antenna/lens system where multiple feeds are in place (for example in an array), the gap between the feeds can be occupied with a filler material (which is not necessarily dielectric) in order to reduce cost. This can be applied to a single lens with single frequency or for stacked lenses (discs for multiple frequencies). For example, in a 360° small cell antenna of the inventive concept, holes between the disc lenses where the cables run through could be so filled.

It should be appreciated that antennae as described above can be utilized as elements for multi-beam, multi-mode, and/or multi-band assemblies, where each lens represents a portion of a cylinder that is configured for stacking.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An antenna for use in wireless communications, comprising:
   a first sub-antenna, comprising a first cylindrical lens and a first emitter that is coupled to the first cylindrical lens, wherein the first cylindrical lens and the first emitter are arranged to provide a first field of view at a first wavelength;
   a second sub-antenna, comprising a second cylindrical lens and a second emitter that is coupled to the second cylindrical lens, wherein the second cylindrical lens and the second emitter are arranged to provide a second field of view at a second wavelength; and
   a cable that is communicatively coupled to the first and second emitters by traversing a first gap between the first and second cylindrical lenses,
   wherein the first and second field of views are non-overlapping,
   wherein the first and second sub-antennae are arranged vertically along their respective central axes.

2. The antenna of claim 1, wherein the first and second wavelengths are substantially identical.

3. The antenna of claim 1, wherein each of the first field of view and the second field of view is substantially equal to 120°.

4. The antenna of claim 1, wherein the cable is in contact with a flat surface of at least one of the first cylindrical lens and the second cylindrical lens.

5. The antenna of claim 1, wherein the cable creates no impingement upon the first and second field of views.

6. The antenna of claim 1, wherein the cable traverses along the curve surface of the second cylindrical lens substantially near the second emitter.

7. The antenna of claim 1, further comprising:
   a third sub-antenna, comprising a third cylindrical lens and a third emitter that is coupled to the third cylindrical lens, wherein the third cylindrical lens and the third emitter are arranged to provide a third field of view at a third wavelength,
   wherein the cable is further communicatively coupled to the third emitter by traversing a second gap between the second and third cylindrical lenses.

8. The antenna of claim 1, further comprising:
   a third sub-antenna, comprising a third cylindrical lens and a third emitter that is coupled to the third cylindrical lens, wherein the third cylindrical lens and the third emitter are arranged to provide a third field of view at a third wavelength; and
   a second cable is communicatively coupled to the third emitter by traversing a second gap between the second and third cylindrical lenses.

9. The antenna of claim 1, further comprising:
a third sub-antenna, comprising a third cylindrical lens and a third emitter that is coupled to the third cylindrical lens, wherein the third cylindrical lens and the third emitter are arranged to provide a third field of view at a third wavelength;
a fourth sub-antenna, comprising a fourth cylindrical lens and a fourth emitter that is coupled to the fourth cylindrical lens, wherein the fourth cylindrical lens and the fourth emitter are arranged to provide a fourth field of view at a fourth wavelength; and
wherein the cable is further communicatively coupled to the third and fourth emitters by traversing a second gap between the second and third cylindrical lenses, and a third gap between the third and fourth cylindrical lenses,
wherein the third and fourth field of views are non-overlapping,
wherein the first, second, third, and fourth sub-antennae are arranged vertically along their respective central axes.

10. The antenna of claim 9, wherein the third and fourth wavelengths are substantially identical.

11. The antenna of claim 10, wherein the first and second wavelengths are different from the third and fourth wavelengths.

12. The antenna of claim 11, wherein the first and second wavelengths cover a low band and the third and fourth wavelengths cover a high band.

* * * * *